US009063565B2

(12) United States Patent
Bokor et al.

(10) Patent No.: US 9,063,565 B2
(45) Date of Patent: Jun. 23, 2015

(54) AUTOMATED AVATAR CREATION AND INTERACTION IN A VIRTUAL WORLD

(75) Inventors: Brian Ronald Bokor, Raleigh, NC (US); Andrew Bryan Smith, Morrisville, NC (US); Steven Keith Speicher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 2166 days.

(21) Appl. No.: 12/100,787

(22) Filed: Apr. 10, 2008

(65) Prior Publication Data

US 2009/0259648 A1  Oct. 15, 2009

(51) Int. Cl.
*G06T 13/00* (2011.01)
*G06F 3/01* (2006.01)

(52) U.S. Cl.
CPC ..................................... *G06F 3/011* (2013.01)

(58) Field of Classification Search
USPC ......................................................... 715/706
See application file for complete search history.

(56) References Cited

U.S. PATENT DOCUMENTS

| 6,285,380 B1* | 9/2001 | Perlin et al. .................... 345/473 |
| 6,563,503 B1* | 5/2003 | Comair et al. ................. 345/473 |
| 2005/0143138 A1* | 6/2005 | Lee et al. ........................ 455/566 |
| 2006/0248461 A1* | 11/2006 | Yamada et al. ............... 715/706 |
| 2007/0075993 A1* | 4/2007 | Nakanishi et al. ............ 345/419 |
| 2008/0081701 A1* | 4/2008 | Shuster ........................... 463/42 |
| 2008/0120558 A1* | 5/2008 | Nathan et al. ................. 715/764 |

* cited by examiner

*Primary Examiner* — Edward Martello
(74) *Attorney, Agent, or Firm* — Moore & Van Allen PLLC

(57) ABSTRACT

Automated avatar creation and interaction in a virtual world may include detecting if a user's avatar has entered a predefined proximity area in the virtual world. An automated avatar may be presented in response to the user's avatar entering the predetermined proximity area. The automated avatar is presented for autonomous interaction with the user's avatar and presentation of the automated avatar is based on a specified criteria.

22 Claims, 2 Drawing Sheets

AUTOMATED AVATAR CREATION AND INTERACTION IN A VIRTUAL WORLD

BACKGROUND OF THE INVENTION

The present invention relates to simulations, virtual world simulations of the real-world or real-life or a virtual world and the like, and more particularly to a system and method for automated avatar creation and interaction in a virtual world.

Computer based simulations are becoming more ubiquitous. Simulations may be used for training purposes, for entertainment or for other purposes. Computer simulations such as Second Life™ or similar simulations present a virtual world which allows users or players to be represented by characters known as avatars. Second Life is a trademark of Linden Research, Inc. in the United States, other countries or both. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents via their avatar can explore the virtual world, meet other users or residents, socialize, participate in individual and group activities, create and trade items (virtual property) and services from one another.

Currently, when an avatar enters a location or an event, no one assists the avatar and the unassisted avatar has to read signs or other material to obtain information regarding goods, services, and the like. For example, if a user wanted his avatar to obtain specific information about a product, location or event, the avatar would need to search the appropriate area until the avatar finds the desired information, finds out the information is unavailable or gives up searching. This approach can have significant drawbacks. For example, users may have a less engaging and/or a frustrating virtual world experience and, thus, may be less likely to purchase items or return to locations and events.

SUMMARY

In accordance with an aspect of the present invention, a method for automated avatar creation and interaction in a virtual world may include detecting if a user's avatar has entered a predefined proximity area in the virtual world. The method may further include presenting an automated avatar in response to the user's avatar entering the predetermined proximity area. The automated avatar is presented for autonomous interaction with the user's avatar and presentation of the automated avatar is based on a specified criteria.

In accordance with another aspect of the present invention, a method for automated avatar creation and interaction in a virtual world may include detecting if a user's avatar has entered a predefined proximity area in the virtual world. The method may also include generating an automated avatar based on a specified criteria and presenting the automated avatar to the user for autonomous interaction with the user's avatar.

In accordance with another aspect of the present invention, a method for automated avatar creation and interaction in a virtual world may include detecting if a user's avatar has entered a predefined proximity area in the virtual world. The method may also include determining an attribute associated with the user's avatar in response to the user's avatar entering the predefined proximity area. The method may also include generating an automated avatar based on the attribute associated with the user's avatar and presenting the automated avatar to the user for autonomous interaction with the user's avatar.

In accordance with yet another aspect of the present invention, a system for automated avatar creation and interaction in a virtual world may include a processor and a module for automated avatar creation and interaction in a virtual world operable on the processor. The module may detect if a user's avatar has entered a predefined proximity area in the virtual world and present an automated avatar in response to the user's avatar entering the predetermined proximity area, where the automated avatar is presented for autonomous interaction with the user's avatar and presentation of the automated avatar is based on a specified criteria.

In accordance with yet another aspect of the present invention, a computer program product for automated avatar creation and interaction in a virtual world may include a computer usable medium having computer usable program code embodied therein. The computer usable medium may include computer usable program code configured to detect if a user's avatar has entered a predefined proximity area in the virtual world. The computer usable medium may further include computer usable program code configured to present an automated avatar in response to the user's avatar entering the predetermined proximity area, where the automated avatar is presented for autonomous interaction with the user's avatar and presentation of the automated avatar is based on a specified criteria.

Other aspects and features of the present invention, as defined solely by the claims, will become apparent to those ordinarily skilled in the art upon review of the following non-limited detailed description of the invention in conjunction with the accompanying figures.

DETAILED DESCRIPTION

Figure 1:
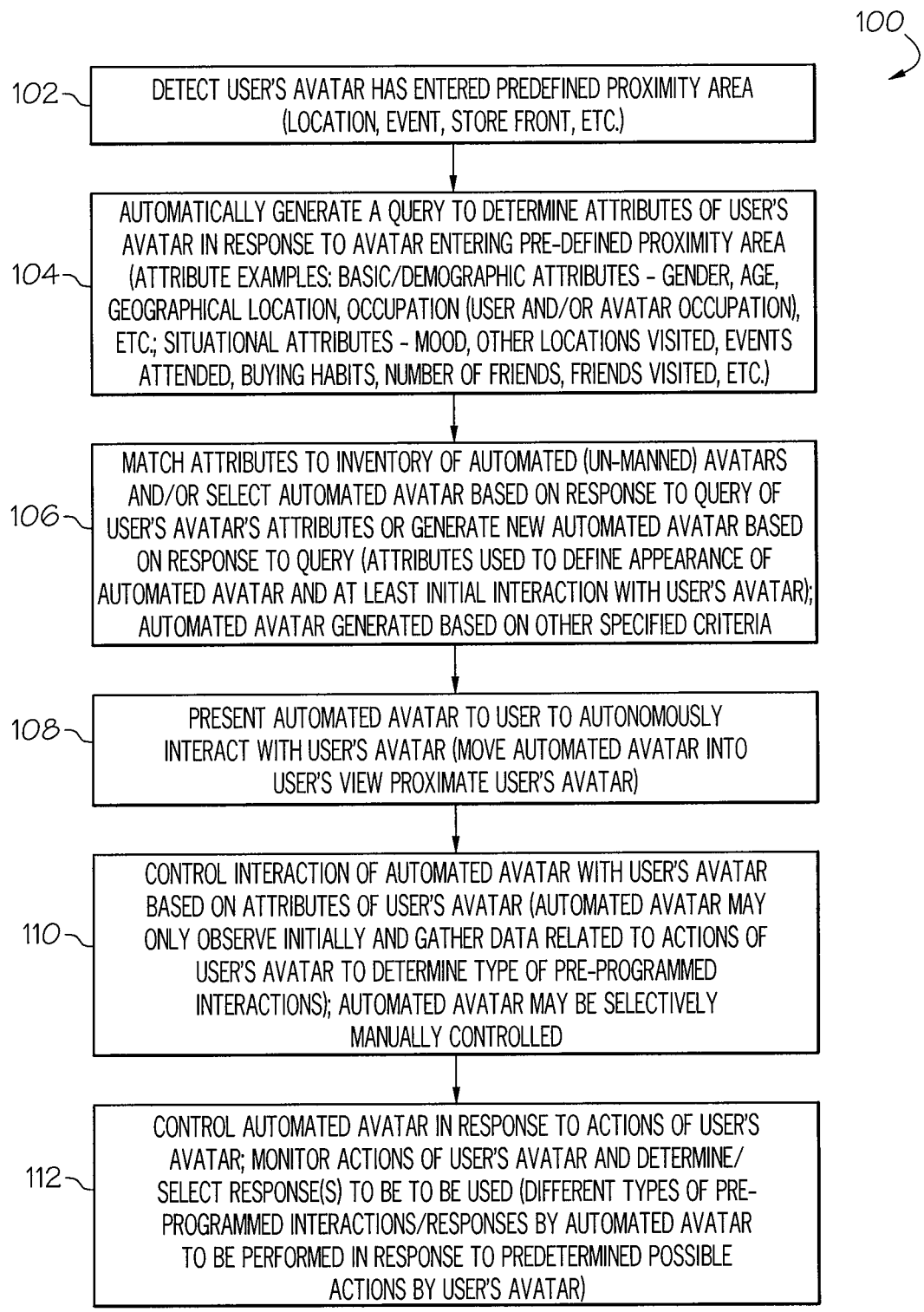
FIG. 1 is a flow chart of an example of a method for automated avatar creation and interaction in a virtual world in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an example of a method 100 for avatar creation and interaction in a virtual world in accordance with an embodiment of the present invention. In block 102, a user's avatar is detected to have entered a predefined proximity area in the virtual world. The predefined proximity area may be a two-dimensional or three-dimensional area in the virtual world extending a predefined distance in any direction from any location, event, store front, or any other virtual world area. The predefined proximity area may be predefined by any virtual world user, such as the owner of a store, the host of an event, a person in charge of a location and/or service, or any other virtual world user. The user's avatar may move into the predefined proximity area through actions of the user controlling the user's avatar, and/or the user may move his avatar such that the predefined proximity area encompasses the user's avatar.

In block 104, one or more attributes of the user's avatar may be automatically determined by any means, such as by automatically generating a query. The attributes of the user's avatar may be any characteristic, quality, feature or any other aspect associated with the user's avatar. Examples of avatar attributes may include any basic attributes or demographic attributes, such as gender, age, race, ethnicity, religion, geographical location, user and/or avatar occupation, or any other similar details about the user's avatar. Other examples of avatar attributes may include situational attributes, such as the avatar's current mood, the avatar's past mood swings and patterns, locations the avatar has visited, events that the avatar has attended, buying habits, the number of friends, friends the avatar has visited and other similar situational information associated with the avatar. One or more attributes of the user's avatar may be determined by querying the user's avatar, the user, the avatar's profile, a database of avatar attributes, or other possible locations where the attributes of the user's avatar may be found. One or more attributes associated with the user's avatar may be obtained in response to the query. Although the attributes may be determined by automatically generating a query, the attributes may also be determined by any other means, such as by the user and/or the user's avatar automatically or manually transmitting the attributes, observing and/or analyzing the user's avatar based on the user's avatar's actions, accessing a previous query of the user's avatar, or other similar determination means.

In block 106, the obtained user's avatar attributes may be compared to one or more automated avatars in an inventory of predefined automated avatars. An automated avatar may be any avatar that may perform autonomous interaction with the user's avatar, observe the user's avatar, or any other similar actions. The automated avatar may be un-manned such that the automated avatar may automatically act without user control. However, under some circumstances or for some purposes, the automated avatar may be selectively manually controlled. Examples of such circumstances or purposes may include training the automated avatar, unexpected actions by the user's avatar or for other situations where manual control may be desired. Control and interaction of the automated avatar is described in more detail with reference to blocks 110 and 112.

The attributes of the user's avatar received in response to the query may be matched to attributes of automated or unmanned avatars in the inventory or any other similar database. In determining whether a match exists between the attributes of the user's avatar and any of the automated avatars, several factors and/or pre-defined matching criteria may be considered. Examples of factors or criteria may include: which attributes of the user's avatar may be used in the matching process; a predetermined number of attributes may need to be matched or substantially matched to select the automated avatar; what constitutes a match; certain attributes of the user's avatar may be assigned a higher priority or weight that other attributes for matching purposes; and any other criteria to facilitate selecting an automated avatar to effectively interact with the user's avatar and enhance the user's experience. If a match is determined to exist based on the matching criteria, then one or more matched automated avatars from the inventory of automated avatars may be selected.

If no match is determined to exist according to the matching criteria, then a new automated avatar may be generated. The newly generated automated avatar may be created based on at least one attribute of the user's avatar. For example, the appearance of the newly generated automated avatar may be defined based on the appearance of the user's avatar. The newly generated automated avatar may also be created based on other specified criteria, such as the location where the automated avatar will be presented, the services that the automated avatar may assist with and the like. The matched automated avatar may also be selected based on the appearance of the user's avatar and the specified criteria defined above.

In block 108, the automated avatar may be presented to the user to autonomously interact with the user's avatar. The automated avatar may be presented to the user at anytime the user is detect to be within the predefined proximity area, the predefined proximity area being previously discussed with respect to block 102. The automated avatar may be moved into the user's view proximate to the user's avatar based on the attributes of the user's avatar. The presentation of the automated avatar to the user may also be delayed based on the attributes of the user's avatar. The user may be presented with an option to block the presentation of the automated avatar and/or to dismiss the automated avatar at any time by any means such as presenting the user with an on screen option, clicking on the automated avatar, selecting an option from a drop down menu list, depressing a series of keys, or other similar options.

In block 110, the interaction of the automated avatar with the user's avatar may be controlled based on at least one attribute of the user's avatar. In one aspect of the present invention, an initial interaction of the automated avatar with the user's avatar may be based on one or more attributes of the user's avatar. For example, if the user's avatar is in a good mood, the automated avatar may initially substantially immediately approach and interact with the user's avatar after being generated. In another scenario, the automated avatar may initially observe the user's avatar. For example, if the user's avatar is in a bad mood, the automated avatar may initially only observe the user's avatar and may wait to interact with the user's avatar until the user's avatar is in a better mood or in some manner conveys a need of a assistance from the automated avatar. While the automated avatar is initially observing the user's avatar, the automated avatar may perform other actions, such as gather data related to actions of the user's avatar, determine pre-programmed interactions for the automated avatar based on gathered data, and other similar actions. The initial interaction may be automatically controlled by a pre-programmed system or may be controlled by a virtual world user. In addition to the initial interaction, other interactions of the automated avatar with the user's avatar may also be based on at least one attribute of the automated avatar. The attributes of the user's avatar may be analyzed such that the automated avatar acts in accordance with such attributes.

In block 112, the automated avatar may also be controlled in response to one or more actions of the user's avatar. The actions of the user's avatar may be determined by observing or monitoring the actions of the user's avatar. The observed actions of the user's avatar may be analyzed and the automated avatar may act in response thereto. The automated avatar actions may be interactions, responses or observations. The actions may be selected from a set of pre-programmed interactions or responses. The pre-programmed interactions or responses may be predefined actions that the automated avatar may perform in response to the user's avatar executing a predetermined action, a predetermined inquiry by the user's avatar, a predetermined event occurring, or any other similar stimulus that may call for a predictable response. For example, the automated avatar may give automated responses to predetermined questions that may be asked by the user's avatar via chat or voice. Different types of pre-programmed interactions or responses may be defined by any user of the virtual world system, by the creator of the automated avatar, by any automated response software or by any other similar entity. The pre-programmed interactions or responses may be stored locally or remotely in a database.

Figure 2:
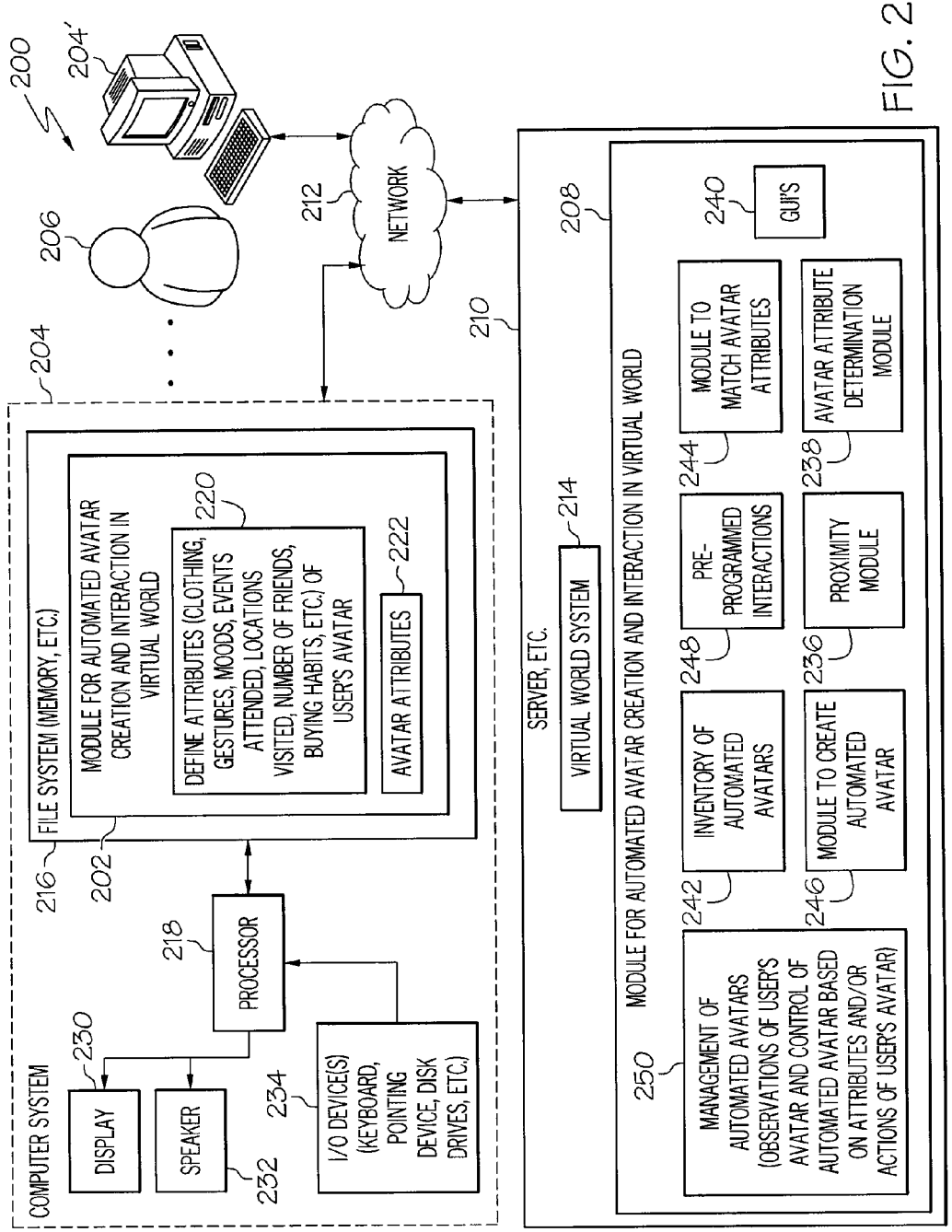
FIG. 2 is a block schematic diagram of an example of a system for automated avatar creation and interaction in a virtual world in accordance with another embodiment of the present invention.

FIG. 2 is a block schematic diagram of an example of a system 200 for avatar creation and interaction in a virtual world in accordance with another embodiment of the present invention. The system 200 may include a module for automated avatar creation and interaction (hereinafter "automated avatar module") 202 operable on a computer system 204, or similar device of a user 206 or client. Alternatively, or in addition to the automated avatar module 202 on the user's computer system 204 or client, the system 200 may include a automated avatar module 208 operable on a server 210 (hereinafter "server automated avatar module") and accessible by the user 206 or client 204 via a network 212. The method 100 may be embodied in or performed by the automated avatar module 202 and/or the server automated avatar module 208. For example, the method 100 may be performed by the automated avatar module 202. In another embodiment of the invention, the method 100 may be performed by the server automated avatar module 208. In a further embodiment of the present invention, some of the features or functions of the method 100 may be performed by the automated avatar module 202 on the user's computer system 204 and other features or functions of the method 100 may be performed on the server automated avatar module 208.

A virtual world simulation system 214 may be operable on the server 210 and may be accessible by a plurality of users 206 or participants using an Internet browser on their respective computer systems 204 or clients. The virtual world simulation system 214 may also be operable on another server separate from the server 210 on which the automated avatar module 208 is operable. The virtual world simulation may be Second Life™ or a similar virtual world system. The automated avatar modules 202 and 208 may be part of the virtual world simulation system 214 or may be separate applications or modules that interface with the virtual world simulation. The network 212 may be the Internet, a private network or other network. Each computer system 204' may be similar to the exemplary computer system 204 and associated components illustrated in FIG. 2.

The automated avatar module 202 and/or 208 may be a self contained system with embedded logic, decision making, state based operations and other functions that may operate in conjunction with a virtual world simulation, such as Second Life™. The self contained system may allow businesses, individuals, services, locations, and the like in the virtual world to interact.

The automated avatar module 202 may be stored on a file system 216 or memory of the computer system 204. The automated avatar module 202 may be accessed from the file system 216 and run on a processor 218 associated with the computer system 204.

The automated avatar module 202 may include a module to define attributes 220. The module to define attributes 220 allows the user to input various attributes regarding the user's avatar into the computer system 204. The module for defining attributes 220 may be accessed or activated whenever the user desires to input information and may call other modules such as the avatar attributes module 222 or GUIs 240 as described below. The module for defining attributes 220 also allows input of the user's avatar attributes by any virtual world entity based on the avatar's actions, by any software communicative with the virtual world system that may observe and/or analyze the actions of the user's avatar and/or by any other entity that may obtain at least one attribute of the user's avatar.

The automated avatar module 202 may also include avatar attributes 222. As previously described with respect to block 104 of FIG. 1, an avatar attribute may include at least one characteristic, quality, feature or any other aspect associated with the user's avatar, such as basic attributes, demographic attributes, situational attributes, and other similar information associated with the avatar. After the avatar attributes of the user's avatar have been defined, as described above with reference to the module for defining attributes 220, the avatar attributes may be stored on the computer system 204 or remotely on the server 210. The avatar attributes 222 may be accessed, queried and/or distributed at any time remotely by the server 210 or locally by the computer system 204.

The user computer system 204 may also include a display 230 and a speaker 232 or speaker system. The display 230 may present the virtual world and the user's avatar as described herein and may permit control of the user's avatar. Any GUIs 240 associated with the automated avatar module 208 and avatar attributes may also be presented on the display 230. The speaker 232 may present any voice or other auditory signals or information to the user 206.

The user computer system 204 may also include one or more input devices, output devices or combination input and output device, collectively I/O devices 234. The I/O devices 234 may include a keyboard, computer pointing device or similar means to control operation of avatars and the automated avatar creation and interaction features described herein. The I/O devices 234 may also include disk drives or devices for reading computer media including computer-readable or computer-operable instructions.

The server automated avatar module 208 may include a proximity module 236. The proximity module 236 may determine when the user's avatar comes within a predefined proximity area or range, as previously discussed with respect to block 102 of FIG. 1. When the user's avatar comes within the predefined proximity area or range, the proximity module 236 may generate an alert within the server automated avatar module 208 to determine or query the attributes of the user's avatar, as previously discussed with regard to block 104 of FIG. 1.

The server automated avatar module 208 may also include a module for determining the attributes associated with the user's avatar 238 (hereinafter "avatar attribute determination module"). The avatar attribute determination module 238 may automatically generate a query to determine attributes associated with the user's avatar in response to the user's avatar entering the proximity area, as previously discussed with regard to block 104 of FIG. 1. The results of the query may be sent to or accessed by other modules of the automated avatar module 208, such as the module to create an automated avatar 246, module to match attributes 244, management of automated avatars 250 or any other module which may utilize the user's avatar attributes.

The server automated avatar module 208 may further include GUIs 240. The server automated avatar may 208 may present one or more predetermined GUIs 240 to permit the user to define attributes associated with the user's avatar or any other information and/or settings. The GUIs may be predetermined and/or presented in response to the user indicating the user would like to enter information and/or settings. The predetermined GUIs may be generated by the server automated avatar module 208 and may be presented on the display 230 of the computer system 204. The GUIs 240 may also include GUIs that permit a virtual world system operator or owner to manage an automated avatar, such as predefining automated avatar functionalities, managing and/or controlling the automated avatar, creating an automated avatar, managing the inventory of automated avatars, predefining the proximity area, as well as any other functions or features associated with automated avatar.

The server automated avatar module 208 may also include an inventory of automated avatars 242. The inventory of automated avatars 242 may include one or more automated avatars. As previously described with regard to block 16 of FIG. 1, an automated avatar may be an avatar that may be autonomously controlled or un-manned and may perform pre-programmed interactions 248 and/or any other automated action. The inventory of automated avatars 242 may be stored locally on the user's computer 204 or the user's computer readable storage medium in a database (not shown). The inventory 242 may also be stored remotely on the network 212 in the database.

The server automated avatar module 208 may also include a module to match attributes 244 of the user's avatar with attributes of automated avatars in the inventory 242 (hereinafter "module to match attributes"). The module to match attributes 244 may determine how many, if any, attributes of the user's avatar match attributes of any one of the automated avatars in the inventory of automated avatars 242 or match a highest number of attributes of any one of the automated avatars. By matching a specified number of user avatar attributes to attributes of an automated avatar, the module to match attributes 244 may determine whether a match exists between an automated avatar in the inventory and the user's avatar based on the attributes of the user's avatar. If the module to match attributes determines that a match exists between the attributes 222 of the user's avatar and an automated avatars 242 in the inventory 242, the module to match attributes 244 may select the matched automated avatar(s) and send an alert message to the module for managing the automated avatars 250 of the matched automated avatar indicating the selected automated avatar(s). However, if the module to match attributes 244 determines a match does not exist between the attributes 222 of the user's avatar and attributes or any automated avatars in the inventory 242, the module to match attributes 244 may send an alert to the module to create an automated avatar 246 to create an automated avatar based on the attributes of the user's avatar. The module to match attributes 244 may also send the matched attributes to the module to create the automated avatar 246.

The module to create an automated avatar 246 may perform various tasks with respect to creating and configuring an automated avatar, including automated avatar generation, determining at least one attribute (e.g. the appearance) of the automated avatar based on at least one attribute of the user's avatar, determining the automated avatar configurations, associating one or more pre-programmed interactions 248 with the automated avatar, and any other functions that may be appropriate for creating an automated avatar. As previously discussed with respect to block 106 of FIG. 1, to create an automated avatar, the newly created automated avatar may be based on a response to the query of the user's avatar's attributes 222. The module to create an automated avatar 246 may determine how many, if any, of the obtained attributes 222 of the user's avatar that may be analyzed and used in generating the automated avatar. The module to create an automated avatar 246 may generate the automated avatar immediately upon the user's avatar entering the predefined proximity area. Although the module to create an automated avatar 246 has heretofore been used to generate a new automated avatar when the user's avatar enters the predefined proximity area, the module to create an automated avatar 246 may generate an automated avatar upon the triggering of any predetermined stimulus.

The server automated avatar module 208 may further include pre-programmed interactions 248. The pre-programmed interactions 248 may include one or more actions that that an automated avatar may autonomously perform and may be predefined. The pre-programmed interactions 248 may be programmed so that the automated avatar may automatically and/or autonomously perform one or more pre-defined actions in response to a predefined stimulus occurring. The pre-programmed interactions 248 may be performed or adjusted such that each pre-programmed interaction 248 is in accordance with the attributes of the user's avatar and/or predicted actions of the user's avatar. Examples of such pre-programmed interactions 248 may include observing the user's avatar if the user's avatar is in a bad mood, greeting and/or providing the user's avatar with information if the user's avatar enters a store, and any other action that the automated avatar may be able to perform. The server automated avatar module 208 may associate one or more pre-programmed interactions 248 with a selected or newly created automated avatar.

The server automated avatar module 208 may also include a module for management of automated avatars 250. The module for management of automated avatars 250 may perform various tasks with respect to the automated avatar, including managing what actions the automated avatar may take, managing the initial interaction of the automated avatar with the user's avatar, managing the automated avatar's observations of the user's avatar based on attributes and/or actions of the user's avatar, managing how and when to present the automated avatar to autonomously interact with the user's avatar, controlling the automated avatar based on the attributes and/or actions of the user's avatar, and other functions which may be appropriate for managing automated avatars. The module for management of automated avatars 250 may access the pre-programmed interactions 248 as well as other modules in managing the automated avatar.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for automated avatar creation and interaction in a virtual world, comprising:
   detecting, by a computer, if a user's avatar has entered a predefined proximity area in the virtual world;
   generating, by the computer, an automated avatar for autonomous interaction with the user's avatar while the user's avatar is in the predefined proximity area, wherein generating the automated avatar comprises selecting the automated avatar from an inventory of pre-established automated avatars based on a specified criteria; and
   presenting, by the computer, the automated avatar in response to the user's avatar entering the predefined proximity area for autonomous interaction with the user's avatar.

2. The method of claim 1, further comprising determining an attribute associated with the user's avatar in response to user's avatar entering the predefined proximity area.

3. The method of claim 2, wherein determining an attribute associated with the user's avatar, comprises determining at least one of a basic attribute, a demographic attribute and a situational attribute.

4. The method of claim 3, wherein said demographic attribute comprises at least one of gender, age, and an occupation, and wherein situational attributes comprise at least one of a mood, a buying habit, and other virtual world locations visited.

5. The method of claim 2, wherein determining an attribute associated with the user's avatar comprises automatically generating a query to determine said attribute associated with the user's avatar in response to the user's avatar entering the predefined proximity area.

6. The method of claim 2, further comprising:
analyzing said attribute associated with the user's avatar; and
controlling the automated avatar in response to the analysis of said attribute associated with the user's avatar.

7. The method of claim 2, further comprising matching said attribute associated with the user's avatar to the inventory of automated avatars based on a response to a query to determine said attribute associated with the user's avatar.

8. The method of claim 7, further comprising selecting the automated avatar from the inventory of automated avatars based on matching the attribute of the user's avatar to the automated avatar in the inventory of automated avatars.

9. The method of claim 8, further comprising generating the automated avatar in response to the attribute associated with the user's avatar not matching any automated avatars in the inventory of automated avatars, wherein the automated avatar is generated based on the attribute associated with the user's avatar.

10. The method of claim 1, further comprising controlling the interaction of the automated avatar with the user's avatar based on an attribute associated with the user's avatar and in response to an action of the user's avatar.

11. The method of claim 1, further comprising:
allowing the automated avatar to observe the user's avatar;
gathering data related to actions of the user's avatar; and
determining a pre-programmed interaction for the automated avatar based on the data.

12. The method of claim 1, further comprising defining an attribute of the automated avatar based on an attribute of the user's avatar.

13. The method of claim 12, wherein defining an attribute of the automated avatar comprises defining an appearance of the automated avatar.

14. A method for automated avatar creation and interaction in a virtual world, comprising:
detecting, by a computer, if a user's avatar has entered a predefined proximity area in the virtual world; and
generating, by the computer, an automated avatar for autonomous interaction with the user's avatar while the user's avatar is in the predefined proximity area, wherein generating the automated avatar comprises selecting the automated avatar from an inventory of pre-established automated avatars based on a specified criteria; and
presenting, by the computer, the automated avatar to the user for autonomous interaction with the user's avatar while the user's avatar is in the predefined proximity area.

15. The method of claim 14, further comprising matching an attribute associated with the user's avatar to an attribute from the inventory of automated avatars based on a response to a query to determine said attribute associated with the user's avatar;
wherein selecting the automated avatar from the inventory of automated avatars comprises:
selecting an automated avatar from the inventory of automated avatars based on matching said attribute associated with the user's avatar to an attribute associated with at least one of the automated avatars in the inventory of automated avatars.

16. The method of claim 14, further comprising determining an attribute associated with the user's avatar in response to the user's avatar entering the predefined proximity area.

17. The method of claim 16, wherein determining an attribute associated with the user's avatar comprises determining at least one of gender, age, geographic location, mood, other locations visited, number of friends, friends visited, buying habits, occupation, and events attended.

18. The method of claim 16, further comprising:
analyzing said attribute associated with the user's avatar; and
controlling the automated avatar in response to the analysis of said attribute associated with the user's avatar.

19. The method of claim 16, further comprising controlling the interaction of the automated avatar with the user's avatar based on said attribute associated with the user's avatar and in response to an action of the user's avatar.

20. A method for automated avatar creation and interaction in a virtual world, comprising:
detecting, by a computer, if a user's avatar has entered a predefined proximity area in the virtual world;
determining, by the computer, an attribute associated with the user's avatar in response to the user's avatar entering the predefined proximity area; and
generating, by the computer, an automated avatar for autonomous interaction with the user's avatar while the user's avatar is in the predefined proximity area, wherein generating the automated avatar comprises selecting the automated avatar from an inventory of pre-established automated avatars based on said attribute associated with the user's avatar; and
presenting, by the computer, the automated avatar to the user for autonomous interaction with the user's avatar while the user's avatar is in the predefined proximity area.

21. A system for automated avatar creation and interaction in a virtual world, comprising:
a processor; and
a module for automated avatar creation and interaction in a virtual world operable on the processor, wherein the module detects if a user's avatar has entered a predefined proximity area in the virtual world, generates an automated avatar for autonomous interaction with the user's avatar while the user's avatar is in the predefined proximity area, wherein the automated avatar is generated by selecting the automated avatar from an inventory of pre-established automated avatars based on a specified criteria, and presents the automated avatar in response to the user's avatar entering the predefined proximity area, wherein the automated avatar is presented for autonomous interaction with the user's avatar while the user's avatar is in the predefined proximity area.

22. A computer program product for automated avatar creation and interaction in a virtual world, comprising: a non-transitory computer usable storage medium having computer usable program code embodied therein, the computer usable program code comprising: computer usable program code configured to detect if a user's avatar has entered a predefined proximity area in the virtual world; computer usable program code configured to generate an automated avatar for autonomous interaction with the user's avatar while the user's avatar is in the predefined proximity area, wherein the computer usable program code configured to generate the automated avatar comprises computer usable program code configured to select the automated avatar from an inventory of pre-established automated avatars based on a specified criteria; and computer usable program code configured to present an automated avatar in response to the user's avatar entering the predefined proximity area, wherein the automated avatar is presented for autonomous interaction with the user's avatar while the user's avatar is in the predefined proximity area.

* * * * *